(12) United States Patent
Hanihara

(10) Patent No.: US 6,646,760 B1
(45) Date of Patent: Nov. 11, 2003

(54) IMAGE PROCESSING METHOD AND APPARATUS

(75) Inventor: Kanji Hanihara, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/390,631

(22) Filed: Sep. 7, 1999

(30) Foreign Application Priority Data

Sep. 7, 1998 (JP) ............................................ 10-252611

(51) Int. Cl.$^7$ .......................... H04N 1/409; H04N 1/58; G06T 5/00
(52) U.S. Cl. ....................... 358/1.9; 358/3.26; 382/275
(58) Field of Search ................................ 358/1.9, 3.26, 358/518, 530; 382/275, 167, 255, 274, 282; 348/241, 222.1; 396/311; 355/52, 40

(56) References Cited

U.S. PATENT DOCUMENTS

| | | | | |
|---|---|---|---|---|
| 5,227,832 A | * | 7/1993 | Kawasaki et al. | 396/213 |
| 5,917,578 A | * | 6/1999 | Nakamura | 396/311 |
| 6,266,054 B1 | * | 7/2001 | Lawton et al. | 382/275 |
| 6,313,902 B1 | * | 11/2001 | Enomoto | 355/40 |
| 6,323,934 B1 | * | 11/2001 | Enomoto | 355/40 |

FOREIGN PATENT DOCUMENTS

| | | |
|---|---|---|
| JP | 2-252375 A | 10/1990 |
| JP | (A)9281613 | 10/1997 |
| JP | 10-187929 A | 7/1998 |

* cited by examiner

Primary Examiner—Scott Rogers
(74) Attorney, Agent, or Firm—Birch, Stewart, Kolasch & Birch, LLP

(57) ABSTRACT

The image processing method and apparatus display a processed image on a monitor as it is reproduced from processed image data obtained by performing specified processing schemes on input image data obtained from a picture optically taken with a taking lens, designate a portion of the processed image on the monitor to create a designated area in accordance with a state of an aberration in the processed image due to the taking lens, determine a corrective value for correcting the aberration based on an information in the input image data for the designated area and correct, based on the corrective value, the aberration on the input image data obtained from the picture and outputting the corrected image data. When the image suitable for outputting a print is obtained from the picture optically taken with the taking lens by the correction of the aberrations due to the taking lens is performed manually, the correction of the aberrations is capable of performing in a uniform and appropriate manner independently of the operator's experience and obtaining efficiently a satisfactory finished print.

10 Claims, 7 Drawing Sheets

IMAGE PROCESSING METHOD AND APPARATUS

BACKGROUND OF THE INVENTION

This invention relates to the technical field of an image processing method and apparatus that are suitable for use with digital photoprinters and so forth that obtain image data from pictures taken with cameras, that perform specified processing schemes on the obtained image data and that produce prints (photographs) as output image. The image processing method and apparatus are capable of correcting the distortion, chromatic aberration of magnification and deterioration of marginal lumination that occur in the pictures taken with inexpensive and low-performance cameras such as films with lens and compact cameras.

Heretofore, the images recorded on photographic films such as negatives and reversals (which are hereunder referred to simply as "films") have been commonly printed on light-sensitive materials (photographic paper) by means of direct (analog) exposure in which the film image is projected onto the light-sensitive material to achieve its areal exposure.

A new technology has recently been introduced and this is a printer that relies upon digital exposure. Briefly, the image recorded on a film is read photoelectrically, converted to digital signals and subjected to various image processing schemes to produce output image data for recording purposes; recording light modulated in accordance with the output image data is used to scan and expose a light-sensitive material to record a latent image, which is subsequently developed to produce a (finished) print. The printer operating on this principle has been commercialized as a digital photoprinter.

In the digital photoprinter, images can be processed as digital image data to determine the exposure conditions for printing, so various operations including the correction of washed-out highlights or flat (dull) shadows due to the taking of pictures with backlight or an electronic flash, sharpening and the correction of deteriorated marginal lumination can be effectively performed to produce prints of the high quality that has not been attainable by the conventional direct exposure technique.

If the pictures taken and recorded on the films are distorted, the quality of the output image on the prints cannot always be improved by the aforementioned corrective measures. There are three causes of the distorted pictures and they are chromatic aberration of magnification, distortion and deterioration of marginal lumination, i.e. reduction in brightness at the edge of image field, which are all due to the low performance of the lenses mounted on the cameras used to take the pictures.

Color images are typically formed of three primary colors, red (R), green (G) and blue (B). The refractive index (imaging magnification) of a lens varies subtly with the wavelength of light and R, G and B lights are imaged at different magnifications to cause "chromatic aberration of magnification". As a result, the image reproduced from the film has a definite color mismatch.

In order to obtain a satisfactory and appropriately recorded image, a plane of a scene of interest that is perpendicular to the optical axis must have an exact correspondence to the imaging plane, i.e., it must be imaged on the same plane perpendicular to the optical axis. In fact however, a single lens element has the imaging plane displaced along the optical axis and the resulting displacement of the imaging position in the axial direction causes a distortion of the imaged object. As a natural consequence, the reproduction of the image on the film is distorted.

Another problem with the pictures focused through the taking lens is that since the lens has such characteristics that the quantity of light decreases from the center of the image outward according to the so-called $\cos^4$ law, the quantity of light at the edge of the image becomes insufficient to assure the desired brightness. This phenomenon is generally called "deteriorated marginal lumination".

Thus, due to the aberration characteristics of each taking lens, the output image becomes distorted and suffers from the problems of color mismatch, distortion and deteriorated marginal lumination.

In cameras such as a single-lens reflex camera that can compete at fairly high price, a plurality of high-precision lens elements are combined to ensure that various aberrations including chromatic aberration of magnification, distortion and deteriorated marginal lumination are effectively corrected to record appropriate images on the film. In contrast, low-performance and inexpensive cameras such as films with lens and compact cameras cannot afford the use of costly lenses and the images recorded on the film suffer from chromatic aberration of magnification, distortion and deteriorated marginal lumination. As a result, the images reproduced on prints become distorted.

To deal with this problem of image deterioration involving the difficulty in improving the quality of output images on prints, techniques have been proposed in connection with an image processing method and apparatus that correct image aberrations in accordance with the characteristics of lens aberrations that are obtained by a lens information acquisition device and a typical example of such technology is disclosed in Unexamined Published Japanese Patent Application (kokai) No. 281613/1997. According to this patent, the proposed technology can correct aberrations due to lenses and prevent the deterioration of image quality in the marginal area, thereby ensuring the production of high-quality images at all times.

However, if the information about the taking lens cannot be acquired preliminarily or if the information about the taking lens can be obtained but the aberration characteristics of the lens cannot, the aberrations due to the low performance of the taking lens, namely, the distortion, chromatic aberration of magnification and deteriorated marginal lumination, cannot be dealt with by the aforementioned technology and the deterioration of the output image cannot be prevented. Even if the lens-related information is obtained and corrective values for performing aberration corrections are selected automatically on the basis of this information, the intended aberration corrections cannot be fully performed and it sometimes occurs that the aberrational distortion remains in the corrected image, making it impossible to prevent image deterioration. In this case, the operator who intends to remove the aberrational distortion in the appropriate manner can rely upon his experience to determine the appropriate corrective values manually and perform the appropriate corrections.

In fact, however, the same operator does not always perform manual corrections and the corrective values that are used in manual corrections vary with the operator's experience. This causes the problem that even if the same negative film is asked to be processed at one or more print output service shops, the desired prints cannot necessarily be obtained that have been given uniform and appropriate aberration corrections.

Conventionally, it is impossible for the operator to verify the image on the monitor after it has been corrected for aberrations and satisfactory prints cannot always be obtained unless a print is output from each of the corrected images to determine whether the correction is appropriate or not. However, this is not an efficient practice since it involves a waste of time and print outputs.

A further problem occurs if the information about the taking lens cannot be acquired preliminarily. Since corrective values cannot be obtained on the basis of the aberration characteristics of the lens, it becomes necessary to perform manual correction of the images in all frames of a roll of film. Although the same lens was used in taking the pictures and, hence, the aberration characteristics of the lens are fixed, the corrective values have to be set manually for each frame and the distorted image resulting from aberrations cannot appropriately be corrected in a rapid and efficient manner while assuring uniformity irrespective of which frames are processed.

SUMMARY OF THE INVENTION

The present invention has been accomplished under these circumstances and has as an object providing an image processing method which, even in the case where the correction of aberrations that was performed automatically on the basis of the information about the taking lens is inappropriate and must be enhanced by manual correction or in the case where corrective values cannot automatically be obtained on the basis of the aberration characteristics of the taking lens and must be replaced by manual correction, is capable of manual correction of distortion, chromatic aberration of magnification and deteriorated marginal lumination in a uniform and appropriate manner independently of the operator's experience and other factors, and which guarantees an efficient and satisfactory finish without causing a waste of print outputs, and which, even in the case of performing manual operation on the images in all frames of a film that were taken with the same lens, employs the same corrective values to perform the same aberration correction, thereby ensuring that the images in all frames are output as prints after they have been corrected for the aberrations in an efficient, uniform and appropriate manner.

Another object of the invention is to provide an image processing apparatus that is suitable for implementing the above-described image processing method.

The first object of the invention can be attained by an image processing method according to its first aspect that obtains input image data from a picture optically taken with a taking lens and that performs specified processing schemes on the obtained input image data to obtain output image data suitable for producing an output image, which comprises the steps of: displaying a processed image on a monitor as it is reproduced from processed image data obtained by performing specified processing schemes on the input image data obtained from the picture; designating a portion of the processed image on the monitor to create a designated area in accordance with a state of an aberration in the processed image due to the taking lens; determining a corrective value for correcting the aberration based on an information in the input image data for the designated area; and correcting, based on the corrective value, the aberration on the input image data obtained from the picture and outputting the corrected image data.

The processed image is preferably one that is reproduced from the processed image data obtained by processing the input image data obtained from the picture such that initial correction of the aberration due to the taking lens is subjected based on an initial correcting value as determined by an information about the taking lens or a predetermined initial correcting value.

In another preferred embodiment, when the corrective value is determined based on the information in the input image data for the designated area, a provisional corrective value is determined for the input image data obtained from the picture and provisional correction is performed based on the provisional correction value to obtain provisionally corrected image data and, depending upon the state of the aberration in a provisionally corrected image, the provisional correcting value is cancelled and the provisionally corrected image data is reverted to the processed image data for the processed image.

In yet another preferred embodiment, the aberration is distortion based on the aberrations of the taking lens, the designated area is defined by a reference line which is either a horizontal line or a vertical line or both that are obtained by designating two points on the processed image and a designated point not lying on the reference line, and the step of determining the corrective value based on the information in the input image data for the designated area is for determining the corrective value for correcting the distortion by determining the correcting value based on the position information about the recorded subject such that the designated point comes to lie on the reference line as a result of correction.

In a further preferred embodiment, the aberration is chromatic aberration of magnification based on the aberrations of the taking lens, the designated area is created by designating the portion which involves a color mismatch caused by the chromatic aberration of magnification in the processed image, and the step of determining the corrective value based on the information in the input image data for the designated area is for determining the corrective value for correcting the chromatic aberration of magnification by first performing provisional correction on the input image data for the designated area, with the corrective value for use in correcting the chromatic aberration of magnification being varied, and then determining the corrective value based on the chromatic aberration of magnification of the processed image in the designated area after it has been corrected provisionally.

In another preferred embodiment, the aberration is deterioration of marginal lumination based on the aberrations of the taking lens, the designated area is a rectangular area within the processed image, that has at a center a single reference point designated from among four reference points that lie on two diagonals across the processed image and which are spaced from an intersection of the two diagonals by a specified distance toward corners of the processed image, and the step of determining the corrective value based on the information in the input image data for the designated area is for determining the corrective value for correcting the deterioration of the marginal lumination by first performing provisional correction on the input image data for the designated area, with the corrective value for use in correcting the deterioration of the marginal lumination being varied, and then determining the corrective value based on the deterioration of the marginal lumination of the processed image in the designated area after it has been corrected provisionally.

Preferably, the single reference point designated from among the four reference points is closest to a position on the processed image, that is designated for correcting the deterioration of the marginal lumination. The specified distance preferably ranges from 0.2 to 0.5 times length of the diagonals. More preferably, the specified distance is 0.35 times the length of the rectangles.

In yet another preferred embodiment, the picture is one that is subjected to image processing after another picture that was taken with the taking lens as same as what was used to take the picture and the predetermined initial corrective value was determined when correcting the aberrations due to the taking lens in the another image.

The second object of the invention can be attained by an image processing apparatus according to its second aspect that obtains input image data from an image optically taken with a taking lens and that performs specified processing schemes on the obtained input image data to obtain output image data suitable for producing an output image, comprising: information acquisition means for acquiring an information about the taking lens used to take the image; initial correcting means for performing on the input image data initial correction of an aberration due to the taking lens based on either an initial corrective value that is determined by the information about the taking lens that was obtained by the information acquisition means or a predetermined initial corrective value; a monitor for displaying an image that has been subjected to the initial correction; designating means by which a portion of the image that has been subjected to the initial correction is designated as a designated area on the monitor; and correcting means which, based on an image information about the designated area created by designation by the designating means, determines a corrective value for correcting the aberration and corrects the aberration in the taken image based on the corrective value.

DETAILED DESCRIPTION OF THE INVENTION

The image processing method of the invention and the image processing apparatus of the invention for implementing the image processing method are now described in detail with reference to the preferred embodiments shown in the accompanying drawings.

Figure 1:
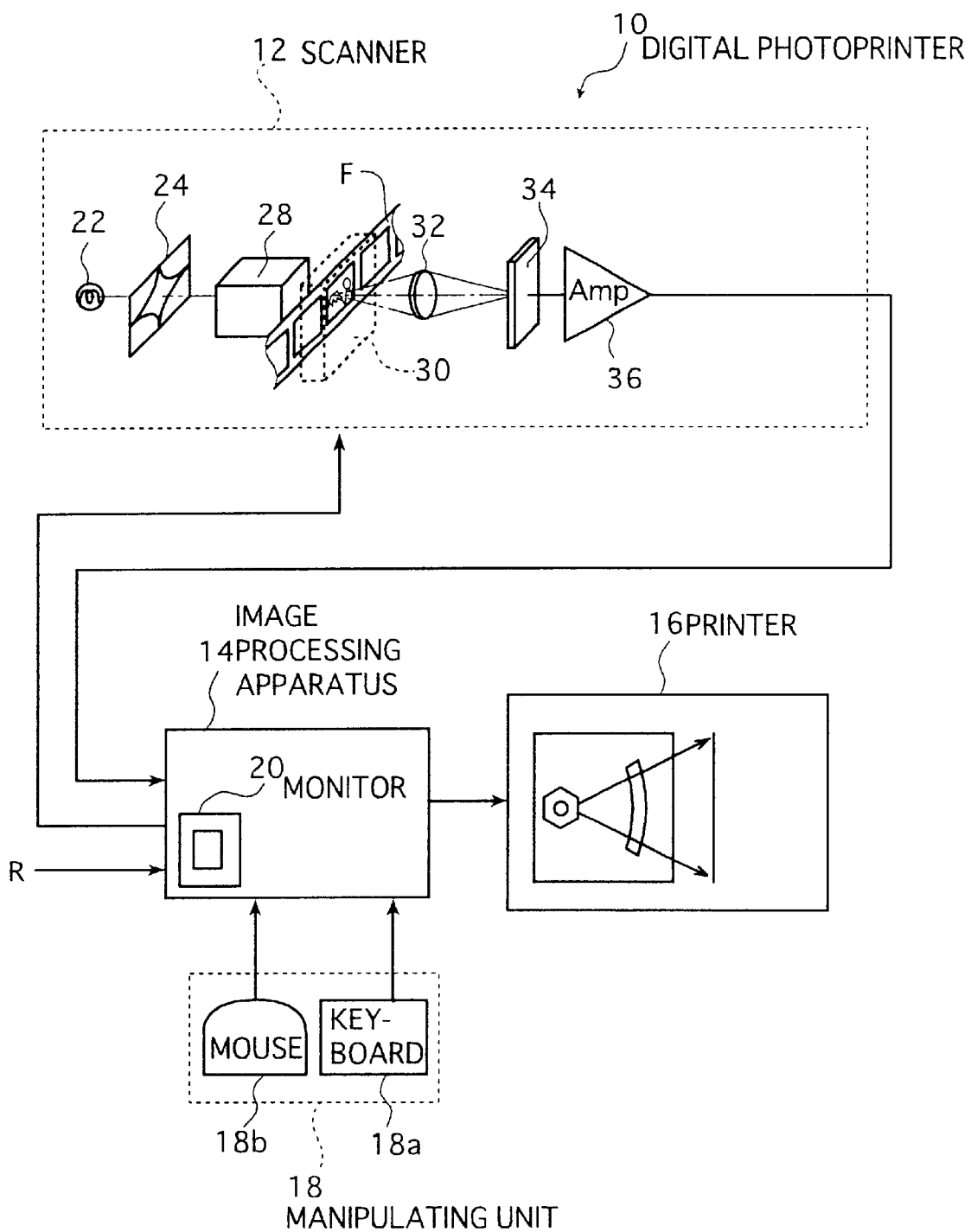
FIG. 1 is a block diagram for an embodiment of a digital photoprinter to which the image processing method of the invention is applied.

FIG. 1 is a block diagram for an embodiment of a digital photoprinter using the image processing apparatus of the invention which implements the image processing method of the invention. The digital photoprinter (hereinafter referred to simply as "photoprinter") generally indicated by 10 in FIG. 1 comprises basically a scanner (image reading apparatus) 12 for photoelectrically reading the image recorded on a film F, an image processing apparatus 14 which performs image processing on the thus read image data (image information) and with which the photoprinter 10 as a whole is manipulated and controlled, and a printer 16 which performs imagewise exposure of a light-sensitive material with light beams modulated in accordance with the output image data delivered from the image processing apparatus 14 and which performs development and other necessary processing to produce a (finished) print.

The image processing apparatus 14 includes a monitor 20 for representing the image captured with the scanner 12, various manipulative commands and pictures for setting and registering various conditions so as to ensure that the operator can correct aberrations manually. Connected to the image processing apparatus 14 is a manipulating unit 18 having a keyboard 18a and a mouse 18b for inputting (setting) various conditions including the adjustment of corrective values, for selecting and commanding a specific processing step and for entering a command and so forth for effecting color/density correction, etc.

The scanner 12 is an apparatus with which the images recorded on the film F are read photoelectrically. It comprises a light source 22, a variable diaphragm 24, a diffuser box 28 which diffuses the reading light incident on the film F so that it becomes uniform across the plane of the film F, an imaging lens unit 32, a CCD sensor 34 which is an image reading photosensor, an amplifier (Amp) 36 and dedicated carriers 30 that can be detachably loaded into the body of the scanner 12.

Figure 2:
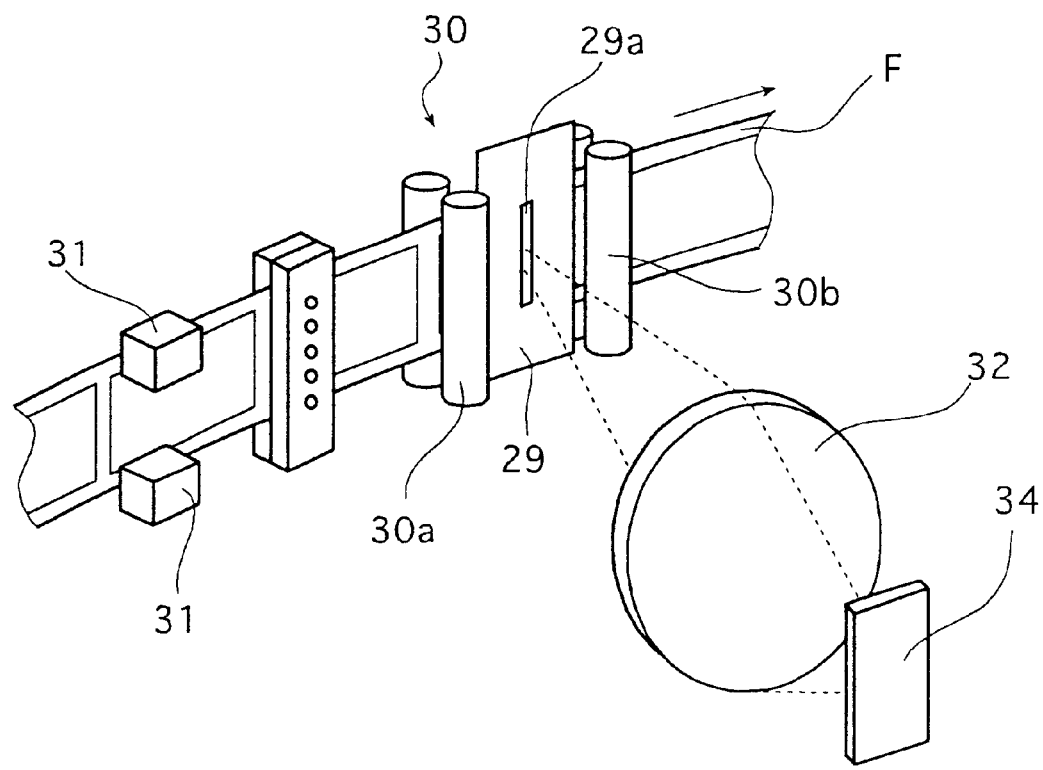
FIG. 2 is a perspective view showing schematically the essential part of an embodiment of an image reading apparatus to be used with the digital photoprinter.

Various dedicated carriers 30 are available that are compatible with elongated films such as films with lens, cartridges of the APS (Advanced Photo System) and 24-exposure films of 135 size. As shown schematically in FIG. 2, the carrier 30 has a pair of transport roller pairs 30a and 30b and a mask 29 having a slit 29a. The transport roller pairs 30a and 30b are provided on opposite sides of the specified reading position in an auxiliary scanning direction which is perpendicular to the main scanning direction (i.e., the direction in which the line CCD sensors in the photosensor 34 extend) and they transport the film F with its length being parallel to the auxiliary scanning direction as it is in registry with the reading position. The slit 29a defines the projected light from the film F to have a specified narrow shape, is in registry with the reading position and extends in the main scanning direction. The carrier 30 also has magnetic READ/WRITE devices 31.

The reading of images with the CCD sensor 34 in the scanner 12 consists of two scans, the first being "prescan" and the second being "fine scan". Prescan is performed to read the image at low resolution and determine image processing conditions such as corrective values for correcting the aberrations due to the taking lens. Prescan also helps the operator to perform verification on the monitor 20. During fine scan, image processing is performed on the basis of the settings of image processing conditions, for example, corrective values for correcting the aberrations due to the taking lens so that desired prints are output.

Therefore, the image data produced in the embodiment under consideration consists of two kinds, one being prescanned image data obtained by prescan and the other being fine scanned image data obtained by fine scan.

In the prescan mode, the reading light from the light source 22 has its quantity adjusted by means of the variable diaphragm 24 and is made uniform by passage through the diffuser box 28; the thus conditioned light is incident on the film F being transported and held in the specified reading position by means of the carrier 30 and thereafter passes through the film F to produce projected light bearing the image recorded on the film F.

The projected light from the film F is focused with the imaging lens unit 32 to form a sharp image on the image-receiving plane of the CCD sensor 34, which reads the image photoelectrically. The output signals are amplified with the Amp 36 and sent to the image processing apparatus 14 as input image data. The sequence of these steps is not performed frame by frame but the images in a roll of film are all read in succession at constant speed.

When all images in the film F are read in succession at constant speed without differentiating between frames and if the film F is an APS film of the type shown in FIG. 3, the bar codes printed in regions S1 at the leading end of the film F, as well as in regions S2 both above and below the individual frames G1, G2 and so forth are also read with the CCD sensor 34, In the case of a film with lens, the taking lens is already known, so in some models, a latent image of a lens type recognizing code is printed as part of the film lot code in regions S1 (see FIG. 3) and later developed to produce a visible bar code on the film F. In this way, the bar code can be read together with the image as it is prescanned with the scanner 12, thereby acquiring the taking lens type recognizing code.

In the APS film shown in FIG. 3, magnetic recording layers are provided on the reverse side of the film F (where no emulsion is coated) in regions S2 both above and below individual frames G1, G2 and so forth of the film F, and the information about the taking lens and the time image shooting was done can be recorded as magnetic information in those magnetic recording layers. During prescan, the recorded magnetic information is read with the magnetic READ/WRITE devices 31 (see FIG. 2) and sent to the image processing apparatus 14. This provides the way to acquire various kinds of information such as the type of the taking lens used and the lens type recognizing code.

Various kinds of information such as the type of the taking lens used and the lens type recognizing code can also be acquired from an IC memory fitted in the cartridge 33.

The fine scan mode is performed in the same manner as the prescan mode. The reading light from the light source 22 has its quantity adjusted by means of the variable diaphragm 24 and is made uniform by passage through the diffuser box 28; the thus conditioned light is incident on the film F being transported and held in the specified reading position by means of the carrier 30 and thereafter passes through the film F to produce projected light bearing the image recorded on the film F.

The projected light from the film F is focused with the imaging lens unit 32 to form a sharp image on the image-receiving plane of the CCD sensor 34, which reads the image photoelectrically. The output signals are amplified with the Amp 36 and sent to the image processing apparatus 14. Unlike in the prescan mode, the sequence of these steps is performed frame by frame on the basis of the information about the center position of each image frame that was obtained during prescan as will be described later.

The image processing apparatus 14 is an embodiment of the image processing apparatus of the invention for implementing the image processing method of the invention. Details of this apparatus are given below.

Figure 4:
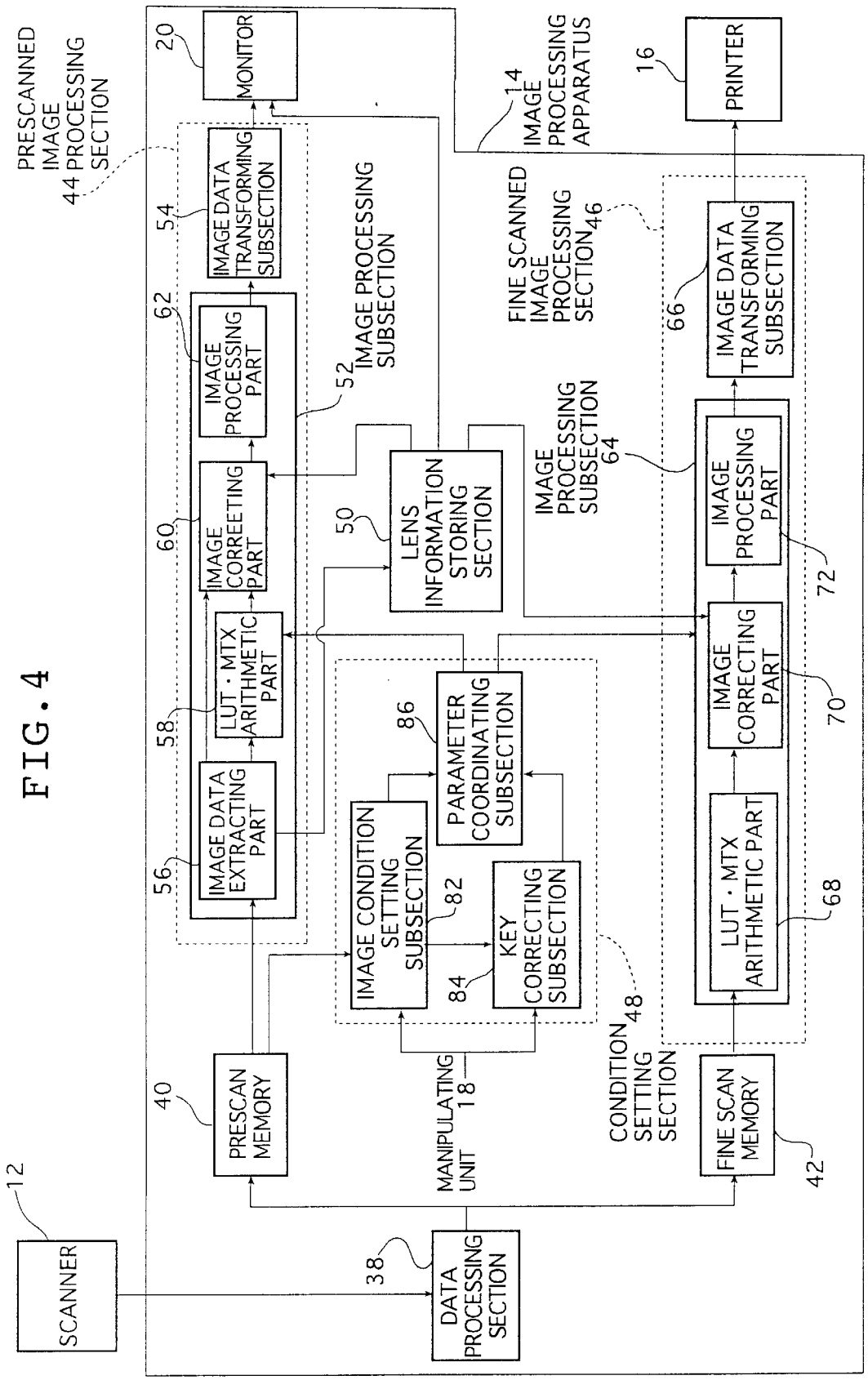
FIG. 4 is a block diagram for an embodiment of the image processing apparatus of the invention.

FIG. 4 is a block diagram for the image processing apparatus 14. Being used to perform specified image processing schemes on the input image data obtained with the scanner 12 and to output the processed image to the printer, the image processing apparatus 14 comprises a data processing section 38, a prescan memory 40, a fine scan memory 42, a prescanned image processing section 44, a fine scanned image processing section 46, a condition setting section 48, a lens information storing section 50 and the monitor 20.

In the data processing section 38, the R, G and B output signals from the scanner 12 are subjected to various processing schemes including A/D (analog/digital) conversion, log conversion, DC offset correction, dark correction and shading correction, whereupon digital input image data is obtained. Of the digital input image data, prescanned image data is stored (loaded) in the prescan memory 40 and fine scanned image data is stored in the fine scan memory 42. The A/D conversion may be performed in the scanner 12 and the scanner 12 may output digital image signals.

The prescan memory 40 and the fine scan memory 42 store the input image data obtained by processing in the data processing section 38 and, at the request for image processing and data outputting, the input data is accessed by the prescanned image processing section 44 or the fine scanned image processing section 46.

The prescanned image processing section 44 comprises an image processing subsection 52 and an image data transforming subsection 54. The image processing subsection 52 comprises an image data extracting part 56, a LUT·MTX arithmetic part 58, an image correcting part 60 and an image processing part 62.

From the data captured together with the picture during prescan, the image data extracting part 56 extracts and recognizes the taking lens type recognizing code which is a part of the lot code; the taking lens type recognizing code is then sent to the lens information storing section 50. The image data extracting part 56 also detects the recorded picture from the data for a roll of film and cuts a portion of the picture; it then calculates the center position of the picture and sends it to the image correcting part 60. The center position is calculated since the correction formulae which are correction functions to be used in the correction of chromatic aberration of magnification, distortion and even the deteriorated marginal lumination (see below) are expressed as functions of the distance from the center position of the picture. The calculated center position of the prescanned image data is correlated to the fine scanned image data and can be used to determine the center position of the fine scanned image data so that automatic frame feed can be performed during fine scan.

The LUT·MTX arithmetic part 58 performs three image processing schemes, color balance adjustment, contrast correction and lightness correction.

Using the correction functions supplied from the lens information storing section 50 to be described below, the image correcting part 60 performs the correction of chromatic aberration of magnification, distortion and deteriorated marginal lumination, as well as electronic magnification for enlarging or reducing the picture. The image correcting part 60 is also the site used by the operator to determine corrective values for correcting the distorted picture due to the aberrations of the taking lens (i.e., chromatic aberration of magnification, distortion and deteriorated marginal lumination) while looking at the processed image on the monitor 20; this is the most characterizing part of the image processing method of the invention.

If the taking lens type recognizing code which is a part of the lot code cannot be extracted or recognized or if the corrective values necessary to perform the correction of aberrations in the image correcting part 60 cannot be obtained in spite of the recognition of the lens type recognizing code, default initial corrective values that are preset for the system or initial corrective values that are preset by operator designation are designated to set functions for correcting the aberration characteristics of the lens, which are then sent to the image correcting part 60.

In response to operator command, the image processing part 62 performs sharpening, dodging and so forth on the image data that has been subjected to aberration corrections, electronic magnification and so forth in the image correcting part 60.

In the image data transforming subsection 54, the image data that has been subjected to image processing in the image processing subsection 52 is transformed with a 3 D (three-dimensional)-LUT or the like so that it is processed into a form suitable for display on the monitor 20.

The fine scanned image processing section 46 comprises an image processing subsection 64 and an image data transforming subsection 66. The image processing subsection 64 comprises a LUT·MTX arithmetic part 68, an image correcting part 70 and an image processing part 72.

The LUT·MTX arithmetic part 68 is a site where under the image processing conditions determined on the basis of the prescanned image data, the fine scanned image data is subjected to color balance adjustment, contrast correction (toning) and lightness correction by processing with LUTs (look-up tables) in accordance with known techniques and to chroma correction by MTX operations in accordance with known techniques.

Using the correction functions already determined for the prescanned image data, the image correcting part 70 performs the correction of chromatic aberration of magnification, distortion and deteriorated marginal lumination on the fine scanned image data, as well as image processing by electronic magnification In response to operator command, the image processing part 72 performs sharpening, dodging and so forth.

In the image data transforming subsection 66, the image data that has been subjected to image processing in the image processing subsection 64 is transformed with a 3 D-LUT or the like so that it is processed into a form suitable for outputting prints from the printer 16.

The condition setting section 48 is used to read the prescanned image data from the prescan memory 40 and determine the image processing conditions. It comprises an image condition setting subsection 82, a key correcting subsection 84 and a parameter coordinating subsection 86.

The image condition setting subsection 82 performs various operations including the construction of density histograms from the prescanned image data and the calculation of various image characteristic quantities such as average density, LATD (large-area transmission density), highlights (minimum density) and shadows (maximum density). In addition, in response to an optionally entered operator command, the image condition setting subsection 82 determines image processing conditions as exemplified by the construction of tables (LUTs) for performing gray balance adjustment and the construction of matrix operational formulae for performing chroma correction.

The key correcting subsection 84 makes another setting of the image processing conditions previously determined on the keyboard 18a or with the mouse 18b. It also sets the corrective values (see below) and creates a designated area from the region of a corrected image. In addition, it designates various output conditions for outputting prints, such as print size, output pixel number and electronic magnification ratio.

The parameter coordinating subsection 86 coordinates all of the adjusted image processing conditions and sends them to the image processing subsections 52 and 64.

For each taking lens type recognizing code, the lens information storing section 50 stores the correction formulae as functions for the correction of chromatic aberration of magnification, distortion and deteriorated marginal lumination, as well as relevant correction coefficients. The lens information storing section 50 is loaded with the correction formulae and coefficients for the aberration characteristics of the lens (i.e., chromatic aberration of magnification, distortion and deteriorated marginal lumination) in association with the taking lens type recognizing code that was extracted and recognized in the image data extracting part 56.

The correction formulae as used in the invention are specifically such that $\Delta P$ which is the amount of modification necessary to correct P which is the data for the image information is expressed as a polynomial of higher degrees of x (which is the first direction of the recorded picture) and y (which is the second direction of the picture), where position coordinates of the picture are represented by (x, y). In the embodiment under consideration, all correction formula and coefficients are expressed as polynomials of higher degrees and their coefficients but this is not the sole case of the invention. The corrective values as used in the invention are values that set the intensity of correction stepwise and they are used to determine correction coefficients in accordance with the intensity of the correction to be performed.

If the taking lens type recognizing code cannot be extracted or recognized or if the correcting values necessary to perform the correction of aberrations in the image correcting part 60 cannot be obtained in spite of the recognition of the lens type recognizing code, default initial corrective values that are preset for the system or initial corrective values that are preset by operator designation are designated to set the coefficients for correcting the aberration characteristics of the taking lens.

As already mentioned, the correction formulae and coefficients for the correction of chromatic aberration of magnification, distortion and deteriorated marginal lumination are stored for each lens type recognizing code. If necessary, the correction coefficients for new lens types can be updated from a correction coefficient supply section (not shown) via various storage media such as FD (floppy disk), MO (magneto-optical disk) and Zip. In addition to a network such as the Internet, telephone lines may also be used to update the correction coefficients.

FIG. 4 shows primarily those sites in the image processing apparatus 14 which relate to image processing. In practice, the image processing apparatus 14 has other components such as a CPU that controls and manages the photoprinter 10 taken as a whole including the image processing apparatus 14, a memory for storing the information necessary to operate the photoprinter 10, and devices for determining the stop-down value of the variable diaphragm 24 and the charge storage time of the CCD sensor 34 during fine scan.

The monitor 20 is necessary for the operator to determine whether the image processing schemes to be applied to the input image data are appropriate or not, particularly whether the correction of chromatic aberration of magnification, distortion and deteriorated marginal lumination is appropriate or not. The monitor 20 is connected to the image processing subsection 52 via the image data transforming subsection 54.

Figure 5:
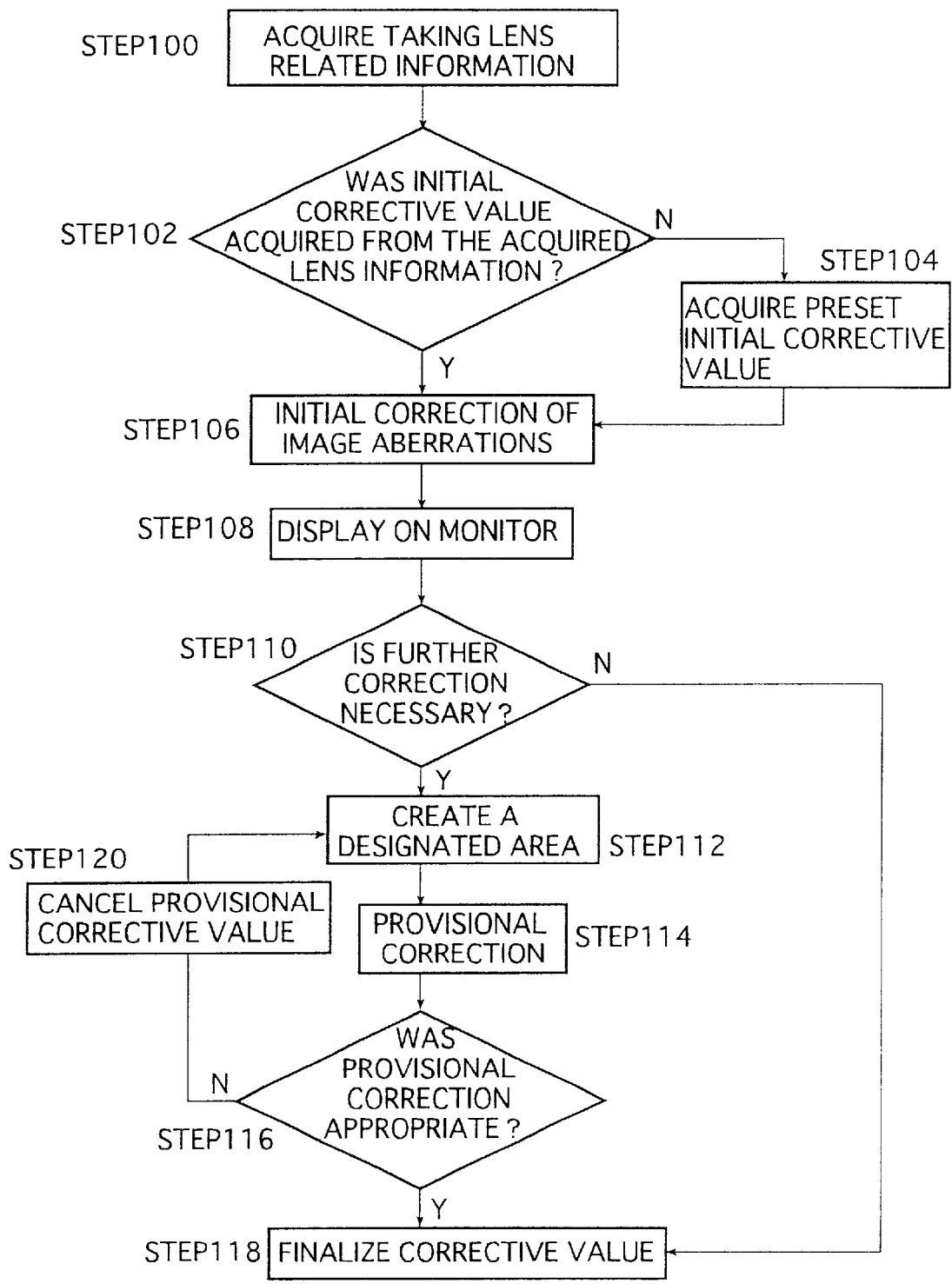
FIG. 5 is a flowchart for the sequence of steps in an example of the image processing method of the invention.

Having described the basic construction of the image processing apparatus 14 for implementing the image processing method of the invention, we now describe the operation of this apparatus and the image processing method of the invention with reference to FIG. 5.

FIG. 5 is a flowchart showing the sequence of steps from the acquisition of taking lens related information to the finalization of corrective values in the image processing method of the invention as it is implemented with the digital photoprinter which applies the image processing apparatus of the invention.

The following description concerns the case where the picture recorded on a film with lens is output as a print.

Figure 3:
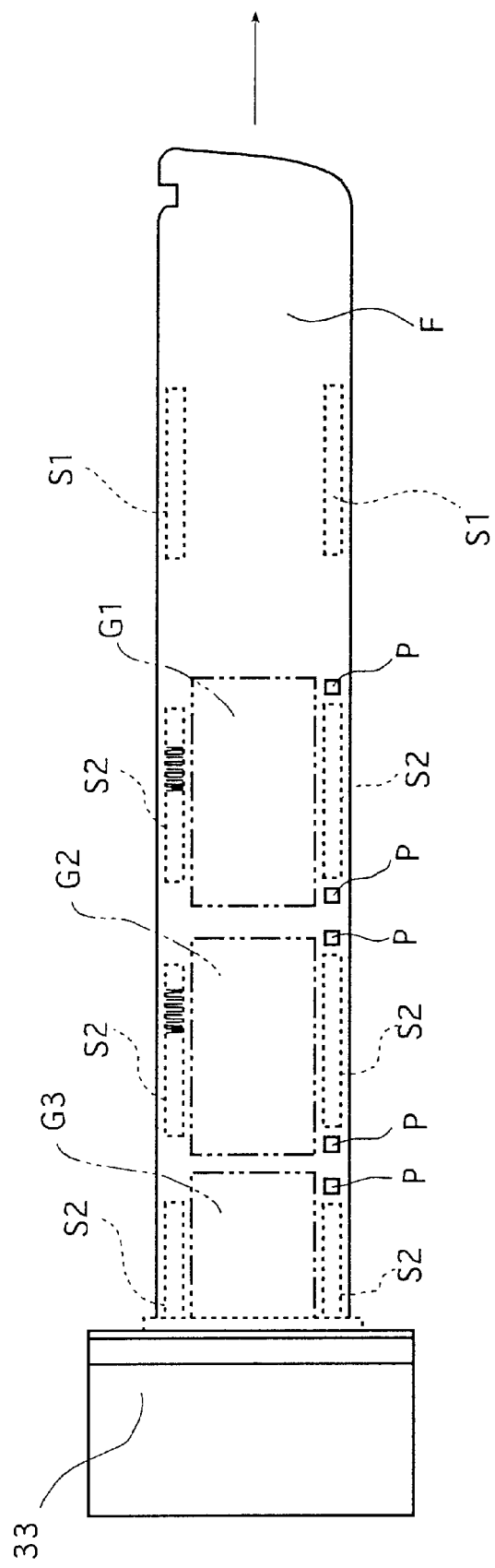
FIG. 3 is a plan view of an example of a film to be set on the image reading apparatus.

First, the image data extracting part 56 accesses the prescan memory 40 to read the data for a roll of film that has been captured with the scanner 12 and recognizes the taking lens type recognizing code within the lot code that is recorded in regions S1 of the film F (see FIG. 3). If the taking lens type recognizing code is successfully recognized, it is sent to the lens information storing section 50.

The lens information storing section 50 thus acquires the information about the taking lens that has been sent from the image data extracting part 56 (see step 100 in FIG. 5). Check is then made to see whether an initial corrective value has been obtained from the acquired information (step 102). This check is necessary since in certain cases, there is no taking lens type recognizing code to extract or the taking lens type recognizing code cannot be recognized or the initial corrective values necessary to perform the correction of aberrations in the image correcting part 60 cannot be obtained in spite of the recognition of the lens type recognizing code.

If no initial corrective value has been acquired on the basis of the acquired lens information, there is no correction coefficient that performs aberration correction on the prescanned image data. Instead, the correction coefficient that has been preset either as default or by operator designation is acquired, namely, a predetermined initial corrective value is acquired (step 104) and thereafter sent to the image correcting part 60.

The default initial corrective value or the operator designated initial corrective value may be used to perform initial correction and this is because the aberration characteristics are essentially independent of the taking lens used and the correction formulae for correcting the aberrations are basically the same. The corrective value, and hence, the intensity of correction, may be adjusted until some appropriate corrective value is located.

Depending on operator designation, the initial corrective value may be adjusted to zero so that the system is set to perform no correction of aberrations.

In a separate step, the prescanned image data stored in the prescan memory 40 is accessed by the image condition setting subsection 82, which performs various operations including the construction of density histograms and the calculation of image characteristic quantities such as average density, LATD (large-area transmission density), highlights (minimum density) and shadows (maximum density). In addition, in response to an optionally entered operator's command, the image condition setting subsection 82 determines image processing conditions as exemplified by the construction of tables (LUTs) for performing gray balance adjustment and the construction of matrix operational formulae for performing chroma correction. The determined image processing conditions are sent to the key correcting subsection 84, where they are further adjusted or another setting of the image processing conditions is obtained. All of the image processing conditions are coordinated in the parameter coordinating subsection 86 and forwarded to the image processing subsection 52.

In the LUT·MTX arithmetic part 58, the prescanned image data is subjected to color balance adjustment, contrast correction (toning), lightness correction and so forth under the operator entered processing conditions and thereafter sent to the image correcting part 60.

In the next step, the prescanned image data is subjected to the initial correction of an aberration (i.e., distortion, chromatic aberration of magnification or deteriorated marginal lumination) in accordance with the correction formula supplied from the lens information storing section 50 and with the correction coefficient determined from the initial corrective value (step 106).

The image data subjected to the initial correction of aberrations is also subjected to electronic magnification in the image correcting part 60. In the image processing part 62, sharpening, dodging and other operations are performed in response to operator command. Thereafter, the image data is transformed with a 3 D-LUT or the like in the image data transforming subsection 54 so that it is processed into a form suitable for display on the monitor 20. Thus, the processed image that has been subjected to the initial correction of aberrations is displayed on the monitor 20 (step 108).

The method of electronic magnification is in no way limited and various known techniques may be employed, as exemplified by the use of bilinear interpolation and spline interpolation.

The processed image being displayed on the monitor 20 is then checked to see if it has been appropriately corrected to eliminate the various distortions due to the aberrations of the taking lens or if a further correction is necessary (step 110). This check is necessary because in certain cases, the distorted image due to aberrations fails to be fully corrected by the initial correction or the initial correction is not performed appropriately since the default initial corrective value was substituted.

If the correction of the picture is found to be unnecessary, the initial corrective value used in the corrective step 106 is determined as the corrective value to be used in correcting the fine scanned image data (step 118).

If the correction of the picture is found necessary, the operator looks at the menu on the monitor screen and selects MANUAL CORRECT so as to perform manual correction of aberrations. MANUAL CORRECT comprises three items, the correction of distortion, the correction of chromatic aberration of magnification and the correction of deteriorated marginal lumination, and an appropriate item is selected by operator designation.

To perform manual correction, the operator first manipulates the keyboard 18a or the mouse 18b to designate a certain region from the picture being displayed on the monitor 20 (step 112), thereby creating a designated area. This designation is not performed on the entire area of the processed image (or picture) that has been subjected to the initial correction but performed on that region of the processed image which is found to have been inadequately corrected for the distortions due to aberrations.

As just mentioned above, the manual correction of aberrations due to the taking lens is directed to three phenomena, i.e., distortion, chromatic aberration of magnification and deteriorated marginal lumination. The following description concerns the case where it is found necessary to perform manual correction of distortion.

Figure 6:
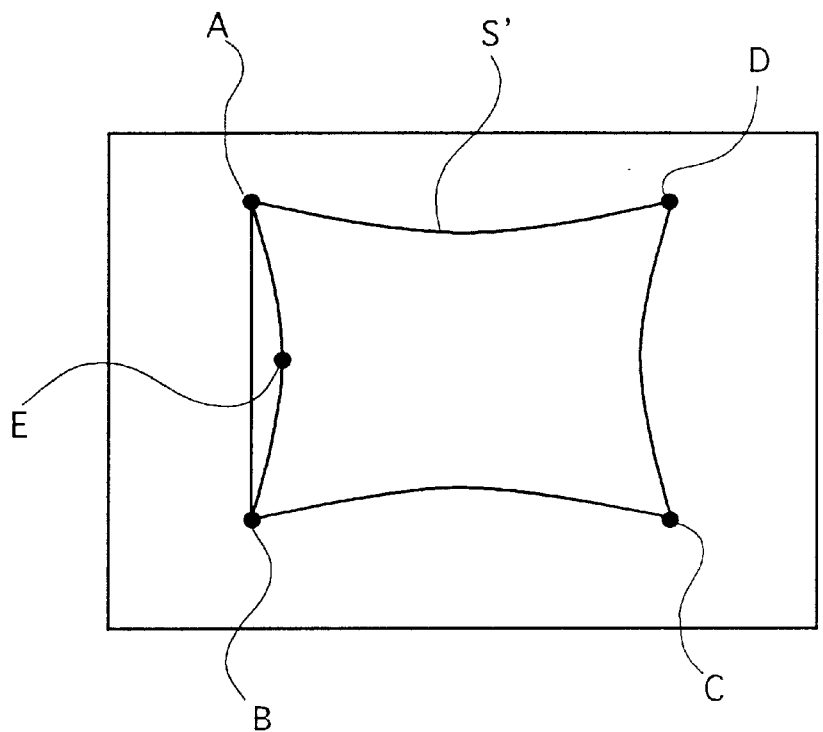
FIG. 6 illustrates an example of an image that is displayed on a monitor when distortion is corrected.

Assume that the picture represents the image of a rectangular shape S. If the distortion due to the aberrations of the taking lens is corrected appropriately, the reproduced image has the correct rectangular shape S. In certain cases, the distortion fails to be corrected appropriately and the reproduced image does not have the rectangular shape S but is distorted into a pincushion as indicated by S' in FIG. 6. Since the subject has the rectangular shape S, the inward curve AB connecting points A and B should inherently be the straight line AB also connecting points A and B. Hence, the operator manipulates the mouse 18b and designates points A and B to create the straight line AB (reference line AB). He also designates an arbitrary point E on the curve AB to create a designated point. The straight line AB and the designated point E define a designated area (step 112). The operator then calculates the correction coefficient in the distortion correcting formula such that the curve AB will coincide with the reference line AB, namely, point E designated as a typical point on the curve AB will be modified to lie on the reference line AB. The required corrective value (provisional corrective value) is thus determined. Using the provisional corrective value, the operator can modify the curve AB to the reference line AB. The reference line that can be designated in the invention is not limited to straight line AB taken in the vertical direction of the picture and horizontal lines such as straight lines BC and AD may also be designated as reference lines.

Based on the thus determined provisional corrective value, the operator performs provisional correction on the whole picture (step 114) and displays the result on the monitor 20. Looking at the provisionally corrected picture on the monitor 20, the operator determines whether the provisional correction was appropriate or not (step 116). If the provisional correction is not found appropriate, the provisionally corrected picture is cancelled (step 120) and the process returns to step 112 so that the creation of a designated area (step 112) and provisional correction (step 114) are repeated.

If the provisional correction is found appropriate, the operator selects the DETERMINE button on the display screen of the monitor 20 and finalizes the provisional corrective value or determines it as the corrective value to be finally applied (step 118). The finalized corrective value is stored in a specified storage section together with the designated area created in step 112 and is later used to correct the lens caused aberration on the fine scanned image data and produce an image to be output as a print.

In accordance with the specific step being carried out and looking at the menu screen on the monitor, the operator can designate a portion of the displayed image and enlarge it. For example, a portion of the image has to be enlarged in order to determine whether the provisional correction has been performed appropriately. The operator can return to step 110 at any desired time. In order to change the current designated area, the operator must return to the initially corrected image or picture which represents the state before the provisional correction. As for the provisionally corrected image, it is possible to select between two modes, one for displaying reference lines and the other for not displaying such reference lines.

Thus, the distortion correcting value determined by manual correction and those values for correcting chromatic aberration of magnification and deteriorated marginal lumination which have been determined without manual correction are obtained from the prescanned image data and these corrective values are used to process the fine scanned image data.

During fine scan, the recorded picture on the film is read with the scanner 12 at a higher resolution than in prescan to obtain image data. Thereafter, the fine scanned image data is subjected to image processing under the conditions determined for the prescanned image, whereby output image data is produced for outputting prints.

When the prescan ends, the film F has been withdrawn from the cartridge 33 to the last image frame. During fine scan, the film F is rewound from that state to read the individual image frames. In this case, the center position of each image with respect to the frames of the film is computed from the image center position for the prescanned image data, so the picture is fine scanned frame by frame using the information about the center position.

The R, G and B output signals from the scanner 12 are subjected to various processing schemes including A/D (analog/digital) conversion, log conversion, DC offset correction, dark correction and shading correction, whereupon digital input image data is obtained. This is the fine scanned image data and stored (loaded) in the fine scan memory 42.

The fine scanned image data stored in the fine scan memory 42 is sent to the LUT·MTX arithmetic part 68, where various image processing schemes are performed by means of tables (LUTs) for gray balance adjustment and so forth and by matrix operational formulae (MTX) for chroma correction under the image processing conditions that have been adjusted and determined by the operator for the prescanned image. After being processed in the LUT·MTX arithmetic part 68, the fine scanned data is sent to the image correcting part 70.

Using the corrective values determined from the prescanned image data, the image correcting part 70 corrects the fine scanned image data for distortion, chromatic aberration of magnification and deteriorated marginal lumination; if necessary, the image correcting part 70 performs the correction of the color mismatch in the scanner. After electronic magnification, the data is sent to the image processing part 72, which optionally performs sharpening, dodging and other operations. The data is thereafter sent to the image data transforming subsection 66, where it is transformed to a form suitable for output from the printer 16. The transformed data is sent to the printer 16 as output image data.

The printer 16 comprises a recording device (exposing device) that records a latent image on a light-sensitive material (photographic paper) by exposing it in accordance with the supplied output image data and a processor (developing device) that performs specified processing schemes including development on the exposed light-sensitive material and which outputs it as a print.

In the recording device, the light-sensitive materialis cut to a specified length as determined by the print to be finally output and, thereafter, three light beams forexposure to R, G and B that are determined by the spectral sensitivity characteristics of the light-sensitive material are modulated in accordance with the output image data from the image processing apparatus 14; the three modulated light beams are deflected in the main scanning direction while, at the same time, the light-sensitive material is transported in the auxiliary scanning direction perpendicular to the main scanning direction so as to record a latent image by twodimensional scan exposure with the light beams. The latent image bearing light-sensitive material is then supplied to the processor. Receiving the light-receiving material, the processor performs a wet development process comprising color development, bleach-fixing and rinsing; the thus processed light-sensitive material is dried to produce a print; a plurality of prints thus produced are sorted and stacked in specified units, say, one roll of film.

The foregoing process assures that if the negative film brought to one or more print output service shops is the same, uniform and appropriate prints can always be obtained in an operator-independent manner. As a further advantage, reference lines can be displayed for comparison with horizontal or vertical lines in the picture. Conventionally, each time the picture is corrected, a print must be output and checked for the appropriateness of the correction. This is a cumbersome and inefficient practice but can be avoided by the method of the present invention and the finish of the prints to be output can be predicted in the pre-print stage.

The above-described method of the invention is also applicable to correct pictures that were taken with a wide-angle lens to experience consideration deformation due to the wide-angle distortions.

Another feature of the invention method is to store the position information for the designated area and the corrective values. If this position information and the corrective values are accumulated, effective correction can be performed for specific types of light-sensitive materials even if the camera used to take the picture is a film with lens for which no adequate lens information is available.

On the foregoing pages, the image processing method of the invention has been described with particular reference being made to the sequence of steps until the finalization of a corrective value when it is necessary to perform manual correction of distortion. We next describe the sequence of steps until the finalization of a corrective value when it is necessary to perform manual correction of chromatic aberration of magnification.

The image data is initially corrected for aberrations on the basis of either the initial corrective value determined from the acquired, taking lens related information or a preset initial corrective value (step 106) and the initially corrected picture is displayed on the monitor 20 (step 108). Looking at the corrected picture, the operator determines whether the initial correction of the aberration was appropriate or needs further correction (step 110). If no further correction is found necessary, the initial corrective value is finalized (step 118).

If it is found necessary to perform the correction of chromatic aberration of magnification, the following steps are taken.

First, the operator selects MANUAL CORRECT of chromatic aberration of magnification from the menu screen on the monitor 20. By operator command from the keyboard 18a or the mouse 18b, a certain region is designated from the picture being displayed on the monitor 20 (step 112) to create a designated area. The creation of a designated area is performed not on the entire part of the corrected picture but on that area of the corrected picture which is found to have been corrected only inadequately for the color mismatch due to chromatic aberration of magnification.

If the designated area is created, it is enlarged automatically. Since chromatic aberration of magnification causes only a very slight color mismatch, the designated area has to be enlarged in order to determine whether the provisional correction of the color mismatch to be described just below has been performed in an appropriate manner. The magnification is 2X at default and can be varied by designating the ratio at the menu section.

Figure 7:
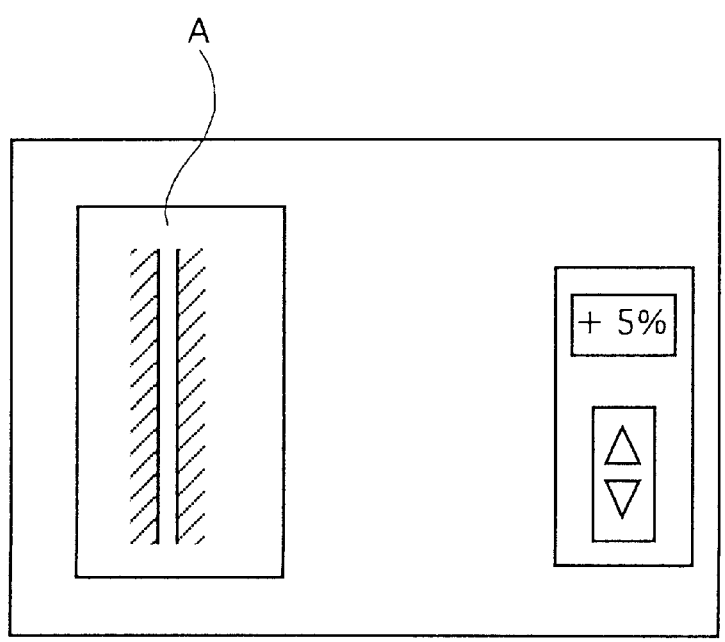
FIG. 7 illustrates an example of an image that is displayed on a monitor when chromatic aberration of magnification is corrected.

An example of the enlarged screen is shown in FIG. 7. On account of the inappropriate correction of chromatic aberration of magnification, the image of subject A has undergone a red and blue color mismatch. It is displayed enlarged on the monitor 20. FIG. 7 shows the displayed image, together with a corrective value on the right side of the screen. The corrective value is expressed as a percentage and it indicates a ratio relative to the correction coefficient used in the initial corrective step 106. The value "+5%" in FIG. 7 means that chromatic aberration of magnification was corrected provisionally using a correction coefficient which was 1.05 times the correction coefficient used in the initial corrective step 106. The corrective value for provisional correction (which is hereunder referred to as "provisional corrective value") varies if either the UP or DOWN triangle in the lower part of the window for corrective values is clicked with the mouse 18b or if the necessary information is keyed in from the keyboard 18a. Each time the provisional corrective value is varied, the enlarged picture on the monitor 20 undergoes provisional correction; therefore, provisional correction is performed by varying the provisional corrective value (step 114) until the subject A shown in FIG. 7 has no more color mismatch; the provisional corrective value that attains this result is thus determined.

If the provisional correction is found appropriate, the operator selects PROVISIONAL CORRECTIVE VALUE DETERMINE on the menu screen and performs provisional correction of the whole picture on the basis of the previously determined provisional corrective value. The operator then checks if the whole picture that has been corrected provisionally is now free of the color mismatch due to chromatic aberration of magnification to determine whether the provisional correction was appropriate or not (step 116).

If the provisional correction of the whole picture is found appropriate, the provisional corrective value is finalized (step 118). This is done by selecting FINALIZE CORRECTIVE VALUE on the menu screen. If the provisional correction is found inappropriate, the provisional corrective value is cancelled (step 120) and the process returns to step 112. If necessary, the operator may return to step 110 from the menu screen in order to review the picture that was initially corrected but which is yet to be corrected provisionally.

Depending upon the specific step being carried out, the operator may appropriately move the designated area or the enlarged picture or switch between the whole picture and the enlarged picture.

We now describe the sequence of steps until a corrective value is finalized in the case where it is found necessary to correct deteriorated marginal lumination.

The image data is initially corrected for aberrations on the basis of either the initial corrective value determined from the acquired, taking lens related information or a preset initial corrective value (step 106) and the initially corrected picture is displayed on the monitor 20 (step 108). Looking at the corrected picture, the operator determines whether the initial correction of the aberrations was appropriate or needs further correction (step 110). If no further correction is found necessary, the initial corrective value is finalized (step 118)J.

If it is found necessary to perform further correction of deteriorated marginal lumination, the following steps are taken.

First, the operator selects MANUAL CORRECT of deteriorated marginal lumination from the menu screen on the monitor 20.

Then, the position in the picture being displayed on the monitor 20 which need be subjected to correction is clicked with the mouse 18b, whereupon two diagonals that connect the four corners of the displayed picture and a reference point are displayed on the screen in superposition on the displayed picture. Also displayed is a rectangular area having the displayed reference point at the center.

Figure 8:
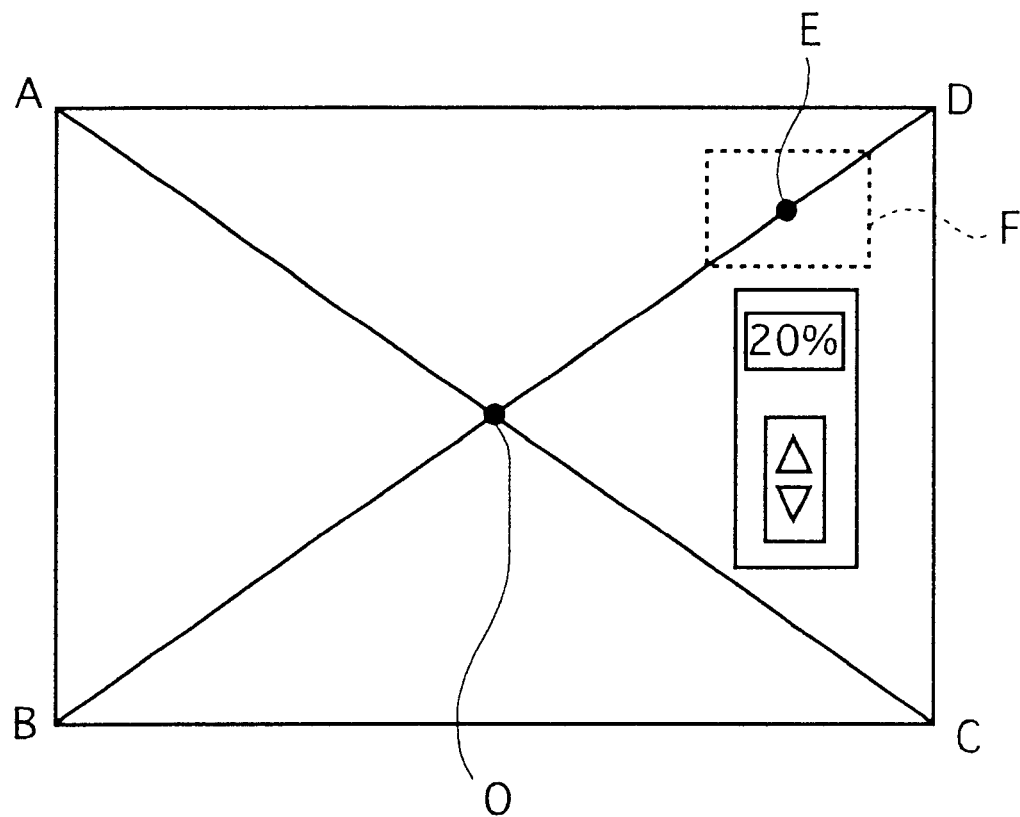
FIG. 8 illustrates an example of an image that is displayed on a monitor when deteriorated marginal lumination is corrected.

FIG. 8 shows an example of the display on the monitor 20. Two diagonals AC and BD and point E lying on the diagonal BD are displayed, with point E serving as a reference point. The reference point E is a designated point located in a position that is spaced from the intersection O of the two diagonals by a distance 0.2–0.5 times, preferably 0.35 times, the length of the diagonals. Also displayed is a certain rectangular box F having the reference point E at the center and this rectangular box is a designated area (step 112). On the right side of the screen, there are displayed a percentage window and UP and DOWN triangles under the window. The value in the percentage window indicates the quantity of light at reference point E as relative to the quantity of light at the image center (the intersection O of the two diagonals) which is taken as 100%. In the case shown in FIG. 8, the quantity of light at reference point E is 20% of the quantity of light at the image center O.

As is generally known, the quantity of light in a picture taken via a lens decreases according to the cosine law and, hence, the deterioration of marginal lumination must be corrected and prevented in an appropriate manner. In this case, the deterioration of marginal lumination can be evaluated by the relative proportion of the quantity of light at a point a certain distance away from the image center. In the image processing method of the invention, this distance is set to range from 0.2 to 0.5 times, preferably 0.35 times, the length of the two diagonals. Four points that serve as a reference for knowing the deterioration of marginal lumination lie on the two diagonals in positions the above-specified distance away from the image center. It is preferred to select the reference point that is the closest to the position that was clicked with the mouse 18b and which the operator found had to be corrected for the reduced quantity of light. The reason for selecting the closest reference point is that the position the operator found had to be corrected for the reduced quantity of light can be effectively corrected for the deteriorated marginal lumination on the basis of the quantity of light at this closest reference point.

The percentage displayed on the right side of the monitor screen is a relative value of the quantity of light at reference point E, with the quantity of light at the image center O being taken as 100. In other words, it is a numerical representation of deteriorated marginal lumination. Under the percentage window, UP and DOWN triangles are displayed. If either of these triangles is clicked with the mouse 18b or in response to each command from the keyboard 18a, the quantity of light in the image within the displayed rectangular box F having the reference point E at the center is corrected provisionally (step 114). Looking at the image within the rectangular box, the operator determines if the provisional correction was appropriate (step 116).

If the provisional correction is found appropriate, the provisional corrective value is finalized (step 118). This is done by selecting FINALIZE CORRECTIVE VALUE on the menu screen. If the provisional correction is found inappropriate, the process returns to step 112. If necessary, the operator may return to step 110 from the menu screen in order to review the picture that was subjected to initial correction but which was yet to be corrected provisionally.

If the corrective value is finalized, both the information about the position where the provisional correction was effected and the finalized corrective value are stored in the storage section as in the manual correction of distortion.

In the foregoing description of manual correction, it is assumed that one picture is selectively corrected for distortion, chromatic aberration of magnification or deteriorated marginal lumination. This is not the sole case of the invention and one picture may be corrected for distortion, chromatic aberration of magnification and deteriorated marginal lumination in that order. Alternatively, two of the three manual corrections may be performed in succession. When two or more manual corrections are to be performed, the order is not an important problem and free to change.

As just mentioned above, the manual corrections of distortion, chromatic aberration of magnification and deteriorated marginal lumination are each an image processing scheme that is performed on one picture. If the pictures in all frames of the same film that were taken with the same lens are to be processed for outputting prints, the same corrective value is desirably used to ensure that the distortions due to aberrations are eliminated uniformly. In this case, the image processing apparatus 14 of the invention uses the finalized corrective value as a preset initial corrective value and performs initial correction on the image in the next frame using the preset initial corrective value preferentially. If this approach is taken to process the pictures on the same film, initially corrected pictures that have been freed of the aberrational distortions in a uniform and appropriate manner can be displayed on the monitor 20 and the desired prints can be output efficiently without the need to perform manual correction at each time of frame change.

If the finalized corrective value is not appropriate for the image in the next frame, provisional correction may optionally be performed to change the corrective value. Since this change of the corrective value need be performed for the first few frames, the image processing of successive frames can be performed while ensuring that the aberrational distortions are efficiently eliminated in a uniform and appropriate manner.

Another feature of the invention method is to store the position information for the designated area and the corrective values. If this position information and the corrective values are accumulated, effective correction can be performed for specific types of light-sensitive materials even if the camera used to take the picture is a film with lens for which no adequate lens characteristics are available.

In addition, the image processing method involving manual corrections can be incorporated as software into the image processing apparatus 14; it is easy to handle and appropriate modifications and alterations are also possible.

While the image processing method and apparatus of the invention have been described above in detail, the invention is by no means limited to the above embodiments only and it should be understood that various improvements and modifications are possible without departing from the scope and spirit of the invention.

As described above in detail, the present invention has the following advantages with respect to the manual correction of distorted pictures due to the aberration characteristics of the taking lens, namely, distortion, chromatic aberration of magnification and deteriorated marginal lumination. If the information about the taking lens or the corrective values based on this information are not attainable or if the corrective values are found inappropriate and need be corrected manually, the operator may provide a designated area in the picture and determine the corrective values on the basis of the information in the image data for the designated area to ensure that uniform and appropriate prints can be output at all times. In addition, the corrected pictures need not be output as prints each time the correction is performed and whether the correction was appropriate or not can be determined before prints are actually output; this helps enhance the efficiency of appropriate image processing schemes that are performed during manual corrections.

Particularly in the case of correcting distortion, reference lines are displayed for comparison with horizontal or vertical lines in the picture, so a satisfactory finish of prints can be predicted efficiently without causing a waste of print outputs. The method of the invention for correcting distortion is also effective for pictures that were taken with a wide-angle lens and which deformed extensively due to wide-angle distortions.

Even if manual corrections are necessary in the case where all frames were taken with the same lens, such as where the pictures in all frames of a roll of film are processed for outputting prints, the aberrational distortions in the pictures can be eliminated immediately, efficiently, uniformly and appropriately in a frame-independent manner.

What is more, the corrective values and the position information for the designated area are stored and can be accumulated for each type of light-sensitive materials. Therefore, effective correction can be performed for specific types of light-sensitive materials even if the camera used to take the picture is a film with lens for which no adequate lens characteristics are available.

What is claimed is:

1. An image processing method that obtains input image data from a picture optically taken with a taking lens and that performs specified processing schemes on the obtained input image data to obtain output image data suitable for producing an output image, which comprises the steps of:

displaying a processed image on a monitor as it is reproduced from processed image data obtained by performing specified processing schemes on the input image data obtained from said picture;

designating a portion of said processed image on said monitor to create a designated area in accordance with a state of an aberration in said processed image due to the taking lens;

determining a corrective value for correcting said aberration based on an information in the input image data for the designated area; and correcting, based on said corrective value, said aberration on the input image data obtained from said picture and outputting the corrected image data.

2. The image processing method according to claim 1, wherein said processed image is one that is reproduced from the processed image data obtained by processing the input image data obtained from said picture such that initial correction of the aberration due to said taking lens is subjected based on an initial correcting value as determined by an information about said taking lens or a predetermined initial correcting value.

3. The image processing method according to claim 1, wherein, when said corrective value is determined based on the information in the input image data for said designated area, a provisional corrective value is determined for the input image data obtained from said picture and provisional correction is performed based on the provisional corrective value to obtain provisionally corrected image data and, depending upon the state of the aberration in a provisionally corrected image, said provisional correcting value is cancelled and said provisionally corrected image data is reverted to the processed image data for said processed image.

4. The image processing method according to claim 1, wherein said aberration is distortion based on the aberrations of said taking lens, said designated area is defined by a reference line which is either a horizontal line or a vertical line or both that are obtained by designating two points on said processed image and a designated point not lying on said reference line, and the step of determining the corrective value based on the information in the input image data for said designated area is for determining the corrective value for correcting the distortion by determining the correcting value based on the position information about the recorded subject such that said designated point comes to lie on said reference line as a result of correction.

5. The image processing method according to claim 1, wherein said aberration is chromatic aberration of magnification based on the aberrations of the taking lens, said designated area is created by designating the portion which involves a color mismatch caused by the chromatic aberration of magnification in said processed image, and the step of determining the corrective value based on the information in the input image data for said designated area is for determining the corrective value for correcting the chromatic aberration of magnification by first performing provisional correction on the input image data for said designated area, with the corrective value for use in correcting the chromatic aberration of magnification being varied, and then determining the corrective value based on the chromatic aberration of magnification of the processed image in said designated area after it has been corrected provisionally.

6. The image processing method according to claim 1, wherein said aberration is deterioration of marginal lumination based on the aberrations of the taking lens, said designated area is a rectangular area within said processed image, that has at a center a single reference point designated from among four reference points that lie on two diagonals across said processed image and which are spaced from an intersection of the two diagonals by a specified distance toward corners of said processed image, and the step of determining the corrective value based on the information in the input image data for said designated area is for determining the corrective value for correcting the deterioration of the marginal lumination by first performing provisional correction on the input image data for said designated area, with the corrective value for use in correcting the deterioration of the marginal lumination being varied, and then determining the corrective value based on the deterioration of the marginal lumination of the processed image in said designated area after it has been corrected provisionally.

7. The image processing method according to claim 6, wherein the single reference point designated from among said four reference points is closest to a position on said processed image, that is designated for correcting the deterioration of the marginal lumination.

8. The image processing method according to claim 6, wherein said specified distance ranges from 0.2 to 0.5 times length of said diagonals.

9. The image processing method according to claim 2, wherein said picture is one that is subjected to image processing after another picture that was taken with the taking lens as same as what was used to take said picture and said predetermined initial corrective value was determined when correcting the aberrations due to said taking lens in said another image.

10. An image processing apparatus that obtains input image data from an image optically taken with a taking lens and that performs specified processing schemes on the obtained input image data to obtain output image data suitable for producing an output image, comprising:

information acquisition means for acquiring an information about the taking lens used to take said image;

initial correcting means for performing on the input image data initial correction of an aberration due to said taking lens based on either an initial corrective value that is determined by the information about the taking lens that was obtained by said information acquisition means or a predetermined initial corrective value;

a monitor for displaying an image that has been subjected to said initial correction;

designating means by which a portion of said image that has been subjected to said initial correction is designated as a designated area on said monitor; and correcting means which, based on an image information about the designated area created by designation by said designating means, determines a corrective value for correcting said aberration and corrects the aberration in said taken image based on the corrective value.

* * * * *